(12) United States Patent
Abe et al.

(10) Patent No.: US 6,705,638 B2
(45) Date of Patent: Mar. 16, 2004

(54) VEHICLE OPCCUPANT PROTECTION DEVICE

(75) Inventors: Kazuhiro Abe, Shiga (JP); Tomohiro Sawa, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/147,992

(22) Filed: May 20, 2002

(65) Prior Publication Data

US 2002/0180188 A1 Dec. 5, 2002

(30) Foreign Application Priority Data

May 30, 2001 (JP) ........................................ 2001-162834

(51) Int. Cl.⁷ .......................... B60R 21/22; B60R 21/16
(52) U.S. Cl. ..................................... 280/730.1; 280/732
(58) Field of Search ............................... 280/730.1, 732

(56) References Cited

U.S. PATENT DOCUMENTS

| 4,552,399 A | * | 11/1985 | Atarashi ................. 296/37.12 |
| 5,443,285 A | * | 8/1995 | Boll ........................... 280/732 |
| 6,039,380 A | | 3/2000 | Heilig et al. |
| 6,416,079 B1 | * | 7/2002 | Lutz et al. ................. 280/730.1 |
| 6,631,920 B1 | | 10/2003 | Webber et al. |

FOREIGN PATENT DOCUMENTS

| DE | 4209604 A1 | * | 10/1992 | ........... B60K/37/04 |
| DE | 29820348 U1 | * | 2/1999 | ......... B60R/21/045 |
| DE | 198 42 672 | | 3/2000 | |
| DE | 19842672 A1 | * | 3/2000 | ......... B60R/21/045 |
| DE | 100 03 706 | | 8/2000 | |

* cited by examiner

*Primary Examiner*—Son T. Nguyen
(74) *Attorney, Agent, or Firm*—Kanesaka & Takeuchi

(57) ABSTRACT

A glove box is mounted to an interior panel in front of a seat of an automobile. A cover of the glove box is rotatable around a hinge shaft for opening and closing the glove box. A vehicle occupant protection device, which has an airbag and a gas generator, is disposed in the cover. The gas generator of the airbag device, which has a large mass, is disposed closer to the hinge shaft than a middle point of a rotational radius of the cover for easy rotations of the cover.

8 Claims, 3 Drawing Sheets

VEHICLE OPCCUPANT PROTECTION DEVICE

BACKGROUND OF THE INVENTION AND RELATED ART STATEMENT

The present invention relates to a protection device for a vehicle occupant. In particular, the present invention relates to a protection device used as a leg-protection device for an automobile occupant for protecting the legs of the occupant in case of a collision of the automobile, and more specifically, to a protection device for an automobile occupant in which an air bag is provided in a glove box.

As the vehicle occupant protection device for protecting the vehicle occupant from colliding with an interior panel in the event of the collision of the vehicle, there is a protection device mainly comprising an airbag installed inside the interior panel (in a space behind the interior panel), a gas generator for inflating the airbag, and a cover for covering the airbag in a normal state (when the vehicle is not in a situation like collision).

In the aforementioned vehicle occupant protection device, the airbag is folded and accommodated inside the interior panel and the cover is disposed to cover the folded airbag.

In the event of the vehicle collision, the gas generator is actuated to spout gas. The gas is supplied into the airbag so as to rapidly inflate the airbag. Upon the inflation of the airbag, the cover is opened so as to allow the airbag to expand out of the interior panel. Therefore, the airbag is inflated and deployed between the interior panel and the vehicle occupant, thereby protecting the vehicle occupant from colliding with the interior panel.

Such an airbag-type protection device for the vehicle occupant includes an airbag disposed in a cover of a glove box for protecting legs of the vehicle occupant by inflating the airbag near the legs.

In the above protection device that the airbag and the gas generator are disposed in the cover of the glove box, the weight of the cover increases, so that the force required for opening and closing the cover increases.

Accordingly, an object of the present invention is to provide a protection device for the vehicle occupant disposed in a glove box, and the glove box or the cover thereof can be easily opened and closed.

Further objects and advantages will be apparent from the following description of the invention.

SUMMARY OF THE INVENTION

A protection device for a vehicle occupant according to the first aspect of the present invention includes a glove box having at least a cover rotatable around a supporting shaft and being disposed in front of a seat of an automobile; an air bag disposed in the cover of the glove box; and a gas generator for inflating the air bag. The gas generator is disposed in the cover closer to the supporting shaft than a middle point of a rotational radius of the rotatable cover.

In the protection device for the vehicle occupant, the gas generator, which is a heavy part, is disposed closer to the supporting shaft. Therefore, a center of gravity of the rotatable glove box or the cover thereof is moved closer to the supporting shaft, thereby reducing the force required for opening and closing the glove box or the cover thereof.

A protection device for a vehicle occupant according to the second aspect of the present invention includes a glove box having at least a cover rotatable around a supporting shaft and being disposed in front of the seat of the automobile; an air bag disposed in the cover of the glove box; and a gas generator for inflating the air bag. At least a part of the gas generator is disposed at an opposite side of the cover with respect to the supporting shaft.

A protection device for a vehicle occupant according to the third aspect of the present invention also includes a glove box having at least a cover rotatable around a supporting shaft and being disposed in front of the seat of the automobile; an air bag disposed in the cover of the glove box; and a gas generator for inflating the air bag. The cover is provided with a protrusion protruding to an opposite side of the cover with respect to the supporting shaft, and the protrusion includes a balance weight.

The protection device for the vehicle occupant in the second and third aspects has the rotatable glove box or the cover thereof that has a center of gravity closer to the supporting shaft. Therefore, the force required for opening and closing the glove box or the cover thereof is reduced.

According to the present invention, a distance between a center of gravity of the component, which is rotatable around the supporting shaft, and an axis of the supporting shaft is preferably less than 100 mm. With this arrangement, the rotatable component (the glove box when the overall glove box is rotatable, or the cover of the glove box when only the cover is rotatable) can be opened and closed easily.

The protection device for the vehicle occupant can be used as a leg protection device for the vehicle occupant.

DETAILED DESCRIPTION OF THE PREFERRED EMBODIMENTS

Figure 1:
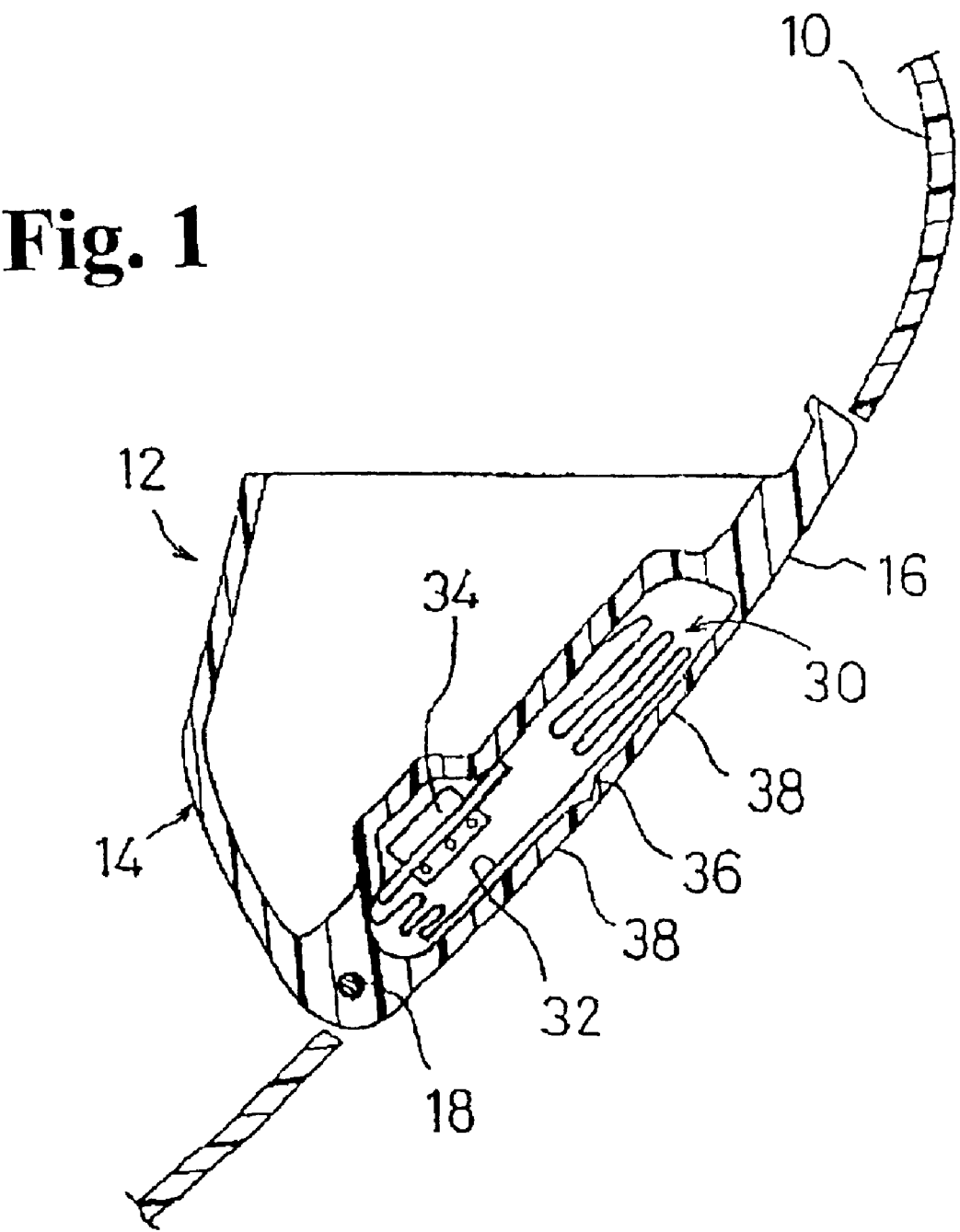
FIG. 1 is a sectional view showing a protection device for a vehicle occupant according to an embodiment of the present invention.

Hereunder, embodiments of the present invention will be explained with reference to the accompanied drawings. FIG. 1 is a sectional view showing a protection device for a vehicle occupant according to an embodiment of the present invention.

A glove box 12 is mounted to an interior panel (for example, an instrument panel or a lower panel) 10 disposed in front of a seat of an automobile. The glove box 12 includes a receiving part 14 that is an open-top container and a cover 16 that forms a front face of the receiving part 14. The glove box 12 is rotatably supported by a hinge shaft 18 as a supporting shaft. The glove box 12 can be positioned either in a closed state shown in FIG. 1 in which the cover 16 is flush with the interior panel 10, or in an open state in which the receiving part 14 and the cover 16 rotate as a unit toward right in FIG. 1 around the hinge shaft 18. Incidentally, FIG. 2, according to another embodiment and explained later, shows a glove box in an open state. The glove box 12 is provided with a latch mechanism and a lock mechanism (both not shown) for latching and locking the glove box 12 when it is closed. These components have configurations similar to those used for a general glove box.

An airbag device 30 is installed in the cover 16. The airbag device 30 includes a folded airbag 32, an inflator (gas generator) 34 for inflating the airbag 32 and a flap part 38 made of a synthetic resin and formed integrally with the cover 16. According to this embodiment, the flap part 38 includes two flaps that open outward. A tear line 36 extends between the two flaps of the flap part 38. A space for storing the airbag 32 is formed behind the flap part 38. A gas inlet of the airbag 32 is connected to a backside of the cover 16 via a flange of the inflator 34.

The inflator 34 is disposed closer to the hinge shaft 18 than a middle point of a rotational radius of the cover 16, that is, a middle point between an axis of the hinge shaft 18 and an end of the cover 16 opposite to the hinge shaft 18 (an end of the cover 16 at the upper right in FIG. 1). It is preferred that the entire inflator 34 is disposed closer to the hinge shaft 18 than the middle point. However, a part of the inflator 34 may be disposed away from the hinge shaft 18 relative to the middle point as long as a major part of the inflator 34 is disposed closer to the hinge shaft 18 than the middle point.

In the protection device for the vehicle occupant, since the inflator 34, which has a larger mass than the airbag 32, is disposed in the vicinity of the hinge shaft 18, a center of gravity of the glove box 12 is located closer to the hinge shaft 18. Therefore, a force required for opening and closing the glove box 12 can be reduced, and opening and closing of the glove box 12 can be performed easily.

When the automobile collides, the inflator 34 ejects gas to inflate the airbag 32. The airbag 32 pushes the flap part 38, and the flap part 38 is thereby broken at the tear line 36 and starts to open. The airbag 32 expands along a front face of the glove box 12 and the interior panel 10 around the glove box 12. The legs of the vehicle occupant are received by the airbag 32 and are thereby protected.

Figure 2:
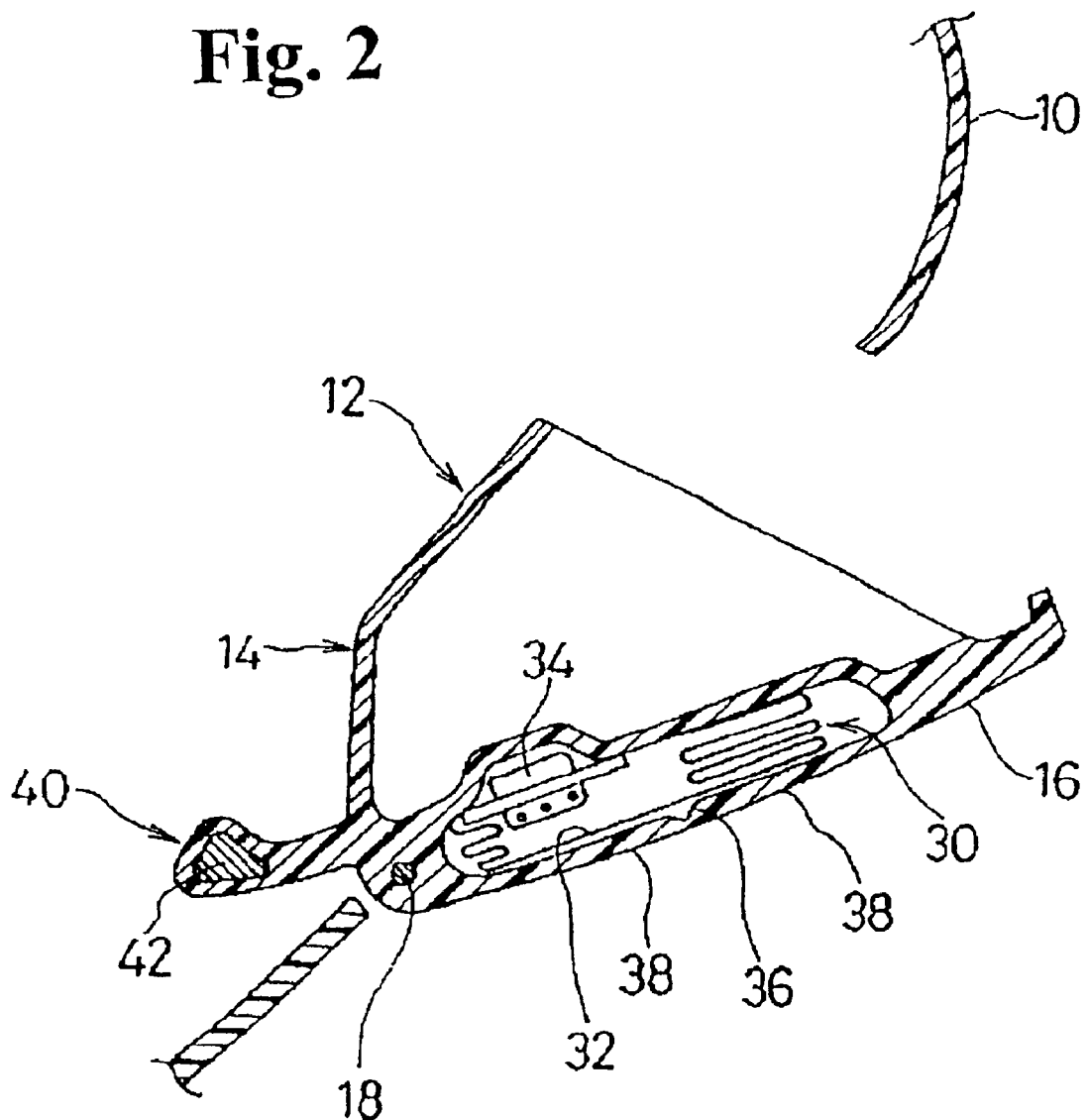
FIG. 2 is a sectional view showing a protection device for a vehicle occupant according to another embodiment.

FIG. 2 is a sectional view showing another embodiment according to the present invention.

According to this embodiment, a protrusion 40 is formed integrally with the glove box 12, and protrudes from the glove box 12 to the direction opposite to the cover 16 with the hinge shaft 18 in between. The protrusion 40 has a balance weight 42 substantially at a distal end thereof. The other configuration shown in FIG. 2 is the same as that shown in FIG. 1, in which the same reference numerals are used for the same components. FIG. 2 shows the glove box 12 in the open state. The glove box 12 shown in FIG. 2 becomes a closed state when it is rotated around the hinge shaft 18 such that the cover 16 is flush with the interior panel 10.

Since the balance weight 42 is provided, according to the present embodiment, a center of gravity of the glove box 12 becomes closer to the hinge shaft 18, whereby the glove box 12 can be rotated easily for opening and closing with a small force.

In FIG. 2, the inflator 34 is disposed on a side closer to the hinge shaft 18 in the same manner as shown in FIG. 1. Therefore, a center of gravity of the glove box 12 becomes closer to the hinge shaft 18 than the case shown in FIG. 1, whereby the glove box 12 can be opened and closed with a smaller force.

Figure 3:
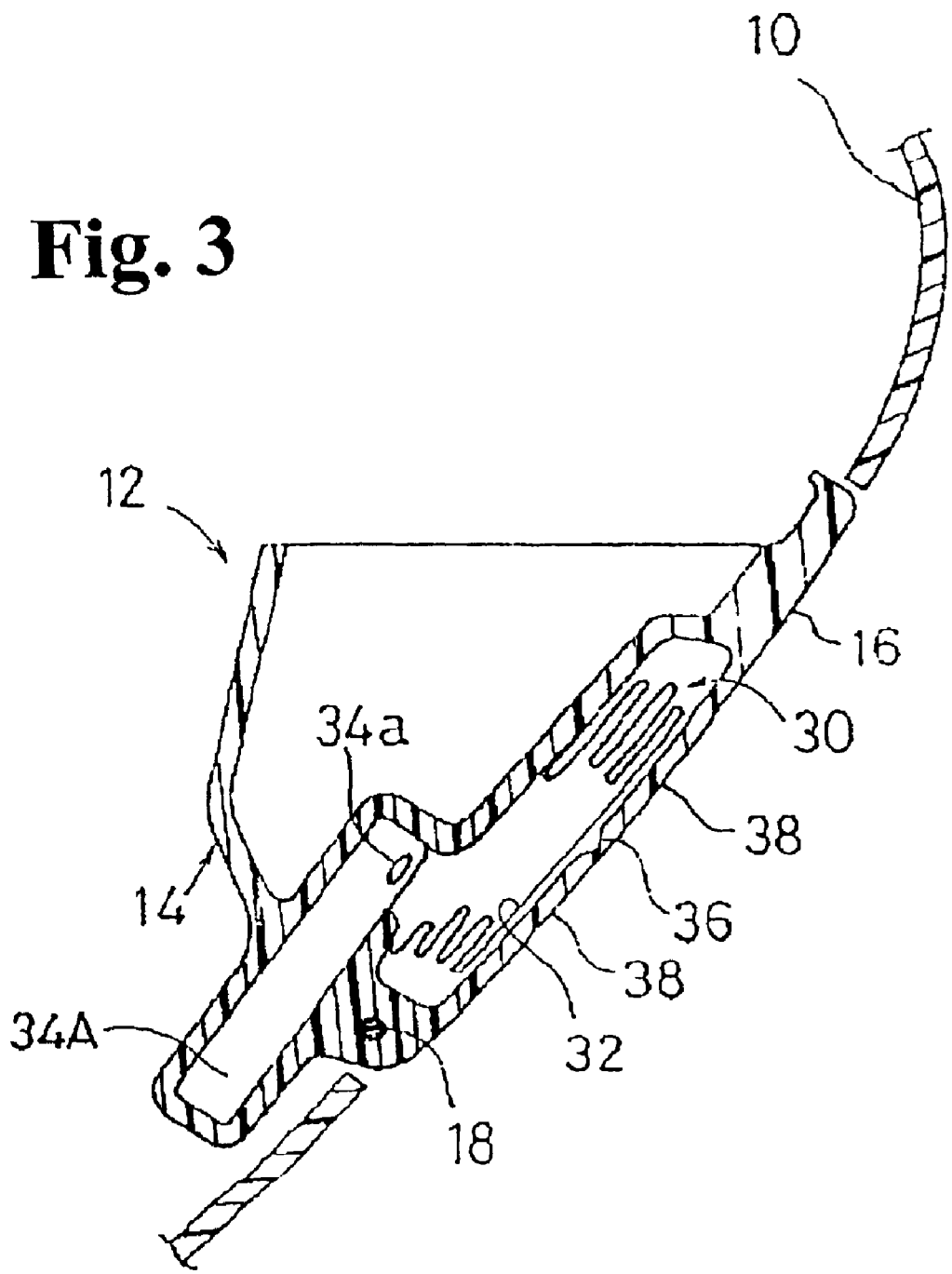
FIG. 3 is a sectional view showing a protection device for a vehicle occupant according to a further embodiment.

FIG. 3 is a sectional view showing a protection device for the vehicle occupant, according to another embodiment of the present invention. In this embodiment, a cylindrical inflator 34A is used. The inflator 34A extends beyond the axis of the hinge shaft 18 in a direction perpendicular to the axis, according to the present embodiment. A gas outlet 34*a* disposed at an end of the inflator 34A is positioned in the cover 16, whereby the gas can be ejected into an airbag 32 through the gas outlet 34*a*. The other end of the inflator 34A is positioned at the opposite side of the cover 16 with respect to the hinge shaft 18. The other configuration, according to the present embodiment, is the same as that shown in FIG. 1. The same reference numerals are used for the same components.

According to the present embodiment, a half of the inflator 34A, which has a large mass, is disposed at a side of the cover 16 closer to the hinge shaft 18 and the other half is disposed at the opposite side of the cover 16 with respect to the hinge shaft 18. Therefore, a center of gravity of the glove box 12 becomes closer to the hinge shaft 18, whereby the glove box 12 can be easily rotated for opening and closing with a small force.

Although in FIG. 3, a half of the inflator 34A is disposed at the opposite side of the cover 16 with respect to the hinge shaft 18, a major portion of the inflator 34A or the whole inflator 34A may be disposed at the opposite side of the cover 16 with respect to the hinge shaft 18. A gas path member for guiding the gas from the inflator 34A into the airbag 32 may be provided.

The receiving part 14 and the cover 16 of the glove box shown in FIGS. 1 to 3 are integrated with each other. However, the present invention is applicable to a protection device for the vehicle occupant, in which only the cover 16 moves to open and close.

When the entire glove box 12 rotates around the hinge shaft 18, as shown in FIGS. 1 to 3, the distance between the center of gravity of the glove box 12 and the axis of the hinge shaft 18 is preferably not greater than 100 mm, and more preferably, not greater than 80 mm. In the case of the protection device for the vehicle occupant in which only the cover rotates around the hinge shaft, the distance between a center of gravity of the cover and the axis of the hinge shaft 18 is preferably not greater than 100 mm, and more preferably, not greater than 80 mm.

As described above, according to the present invention, the glove box having an airbag for protecting the vehicle occupant can be easily opened with a small force.

While the invention has been explained with reference to the specific embodiments of the invention, the explanation is illustrative and the invention is limited only by the appended claims.

What is claimed is:

1. A vehicle occupant protection device for protecting a vehicle occupant, comprising:
    a glove box disposed in a vehicle, and having a receiving part for receving an article therein, a cover forming a front face of the receiving part and integrally formed therewith, and a supporting shaft for rotationally supporting the cover with the receiving part to open and close the glove box,
    an air bag disposed in the cover, and
    a gas generator for generating gas disposed in the cover and connected to the air bag to inflate the air bag, said gas generator being arranged closer to the supporting shaft than a middle point of a rotational radius of the cover rotating around the supporting shaft.

2. A vehicle occupant protection device according to claim 1, wherein the gas generator is disposed in the cover crossing the supporting shaft so that the gas generator is located on two sides of the cover with respect to the supporting shaft.

3. A vehicle occupant protection device according to claim 1, further comprising a protrusion disposed on the cover protruding to a side opposite to the cover with respect to the supporting shaft.

4. A vehicle occupant protection device according to claim 3, wherein said protrusion includes a balance weight so that the cover is balanced with respect to the protrusion with the balance.

5. A vehicle occupant protection device according to claim 1, wherein a distance between a center of gravity of the cover and an axis of the supporting shaft is less than 100 millimeters.

6. A vehicle occupant protection device according to claim 1, wherein a distance between a center of gravity of the glove box with the air bag and the gas inflator, and the supporting shaft is less than 100 mm.

7. A vehicle occupant protection device according to claim 1, wherein said cover includes a space therein, in which the air bag and the gas generator are disposed.

8. A vehicle occupant protection device according to claim 1, wherein said supporting shaft is formed separately form and non-coaxially with the gas generator.

* * * * *